US009622223B2

(12) United States Patent
Speight

(10) Patent No.: US 9,622,223 B2
(45) Date of Patent: *Apr. 11, 2017

(54) REQUESTING A COMMUNICATION RESOURCE IN A WIRELESS NETWORK

(71) Applicant: CISCO TECHNOLOGY, INC., San Jose, CA (US)

(72) Inventor: Timothy James Speight, Bristol (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 14/317,453

(22) Filed: Jun. 27, 2014

(65) Prior Publication Data

US 2014/0307716 A1 Oct. 16, 2014

Related U.S. Application Data

(63) Continuation of application No. 12/016,953, filed on Jan. 18, 2008, now Pat. No. 8,768,370, which is a continuation of application No. 10/190,345, filed on Jul. 5, 2002, now Pat. No. 7,340,256.

(30) Foreign Application Priority Data

Jul. 6, 2001 (GB) .................... 0116554.7

(51) Int. Cl.
*H04W 72/04* (2009.01)
*H04W 74/08* (2009.01)
(52) U.S. Cl.
CPC ... *H04W 72/0413* (2013.01); *H04W 74/0866* (2013.01); *H04W 72/0406* (2013.01)
(58) Field of Classification Search
CPC ......... H04W 72/0406; H04W 72/0413; H04W 74/0866
See application file for complete search history.

(56) References Cited

U.S. PATENT DOCUMENTS

| 5,960,352 A | 9/1999 | Cherpantier |
| 5,991,285 A | 11/1999 | Ghosh |
| 5,991,627 A | 11/1999 | Honkasalo et al. |
| 6,122,291 A | 9/2000 | Robinson et al. |
| 6,167,270 A | 12/2000 | Rezaiifar et al. |
| 6,721,566 B2 | 4/2004 | Longoni et al. |

(Continued)

FOREIGN PATENT DOCUMENTS

| EP | 1009174 A2 | 6/2000 |
| EP | 1021003 A2 | 7/2000 |

(Continued)

OTHER PUBLICATIONS

"Universal Mobile Telecommunications System (UMTS); RRC Protocol Specification (3GPP TS 25.331 version 3.6.0 Release 1999)," (Mar. 2001). ETSI TS 125 331 v3.6.0:1-710.
"Universal Mobile Telecommunications System (UMTS); UTRAN Functions, Examples on Signaling Procedures (3GPP TR 25.931 version 3.3.0 Release 1999)," (Mar. 2001). ETSI TR 125 931 v3.3.0:1-76.

(Continued)

*Primary Examiner* — Lewis West
(74) *Attorney, Agent, or Firm* — Patent Capital Group

(57) ABSTRACT

A network device to send to a user equipment (UE) configuration information to configure a power controlled uplink control channel particular to the UE is disclosed. The UE may send a request to utilize a physical uplink shared channel capable of being shared by a plurality of UEs. The request may be received at a first power and other information is received at a second power.

30 Claims, 2 Drawing Sheets

(56) References Cited

U.S. PATENT DOCUMENTS

| | | | |
|---|---|---|---|
| 6,747,976 | B1 | 6/2004 | Bensaou et al. |
| 6,785,510 | B2 | 8/2004 | Larsen |
| 6,807,192 | B2 | 10/2004 | Terry |
| 6,888,795 | B2 | 5/2005 | Gupta et al. |
| 6,963,540 | B2 | 11/2005 | Choi et al. |
| 6,993,340 | B1 | 1/2006 | Rinne et al. |
| 7,039,030 | B2 | 5/2006 | Terry |
| 7,158,537 | B2 | 1/2007 | Bender et al. |
| 7,292,861 | B2 | 11/2007 | Rinne et al. |
| 7,366,094 | B2 | 4/2008 | Speight |
| 7,426,394 | B2 | 9/2008 | Rinne |
| 7,502,351 | B2 | 3/2009 | Farley et al. |
| 7,616,603 | B2 | 11/2009 | Anderson et al. |
| 8,488,453 | B2 | 7/2013 | Zhang et al. |
| 2001/0036810 | A1 | 11/2001 | Larsen |
| 2001/0053140 | A1 | 12/2001 | Choi et al. |
| 2002/0114287 | A1 | 8/2002 | Gupta et al. |
| 2002/0173311 | A1 | 11/2002 | Biggs et al. |
| 2003/0118049 | A1 | 6/2003 | Bender et al. |
| 2004/0240471 | A1 | 12/2004 | Terry |
| 2007/0133458 | A1 | 6/2007 | Chandra et al. |
| 2008/0194282 | A1 | 8/2008 | Nibe et al. |
| 2009/0046667 | A1 | 2/2009 | Pelletier et al. |

FOREIGN PATENT DOCUMENTS

| | | | |
|---|---|---|---|
| EP | 1168876 | A1 | 1/2002 |
| WO | 9534168 | A2 | 12/1995 |
| WO | 0042803 | A1 | 7/2000 |
| WO | 0074292 | A1 | 12/2000 |
| WO | 0103448 | A2 | 1/2001 |
| WO | 0117283 | A2 | 3/2001 |

OTHER PUBLICATIONS

Great Britain Search Report mailed Mar. 2, 2002, for GB Application No. 0116554.7 filed Jul. 6, 2001, 3 pages.
International Search Report mailed Mar. 4, 2003, for PCT Application No. PCT/GB02/03126 filed Jul. 8, 2002, 3 pages.
Notice of Allowance, U.S. Appl. No. 10/190,345 (issued as U.S. Pat. No. 7,340,256), mailed on Oct. 4, 2007.
Notice of Allowance, U.S. Appl. No. 10/190,345 (issued as U.S. Pat. No. 7,340,256), mailed on Jun. 29, 2007.
Non-Final Rejection, U.S. Appl. No. 10/190,345 (issued as U.S. Pat. No. 7,340,256), mailed on Aug. 9, 2006.
Non-Final Rejection, U.S. Appl. No. 10/190,345 (issued as U.S. Pat. No. 7,340,256), mailed on Feb. 22, 2006.
Final Rejection, U.S. Appl. No. 10/190,345 (issued as U.S. Pat. No. 7,340,256), mailed on Jun. 6, 2005.
Non-Final Rejection, U.S. Appl. No. 10/190,345 (issued as U.S. Pat. No. 7,340,256), mailed on Aug. 26, 2004.
Non-Final Rejection, U.S. Appl. No. 10/190,345 (issued as U.S. Pat. No. 7,340,256), mailed on Nov. 24, 2003.
Notice of Allowance, U.S. Appl. No. 12/016,953 (issued as U.S. Pat. No. 8,768,370), mailed on Feb. 21, 2014.
Final Rejection, U.S. Appl. No. 12/016,953 (issued as U.S. Pat. No. 8,768,370), mailed on Oct. 16, 2013.
Non-Final Rejection, U.S. Appl. No. 12/016,953 (issued as U.S. Pat. No. 8,768,370), mailed on Jun. 25, 2013.
Final Rejection, U.S. Appl. No. 12/016,953 (issued as U.S. Pat. No. 8,768,370), mailed on Sep. 27, 2012.
Non-Final Rejection, U.S. Appl. No. 12/016,953 (issued as U.S. Pat. No. 8,768,370), mailed on Nov. 8, 2011.
Final Rejection, U.S. Appl. No. 12/016,953 (issued as U.S. Pat. No. 8,768,370), mailed on Oct. 8, 2010.
Non-Final Rejection, U.S. Appl. No. 12/016,953 (issued as U.S. Pat. No. 8,768,370), mailed on Jan. 22, 2010.

REQUESTING A COMMUNICATION RESOURCE IN A WIRELESS NETWORK

CROSS REFERENCE TO RELATED APPLICATIONS

This application is a continuation of U.S. application Ser. No. 12/016,953 filed Jan. 18, 2008, which is a continuation of U.S. application Ser. No. 10/190,345, filed Jul. 5, 2002, which issued as U.S. Pat. No. 7,340,256 on Mar. 4, 2008, and further claims priority to United Kingdom Application No. 0116554.7, filed Jul. 6, 2001, all of which are hereby incorporated by reference in their entirety.

FIELD OF INVENTION

This invention relates to an enhancement to an access mechanism for a communication system. The invention is applicable to, but not limited to, a communication resource access mechanism, particularly when uplink shared channels are employed in a Universal Terrestrial Radio Access (UTRA) Wideband-CDMA system, as used in the Universal Mobile Telecommunication Standard (UMTS).

BACKGROUND OF THE INVENTION

Wireless communication systems, for example cellular telephony or private mobile radio communication systems, typically provide for radio telecommunication links to be arranged between a plurality of base transceiver stations (BTSs) and a plurality of subscriber units, often termed mobile stations (MSs).

Wireless communication systems are distinguished over fixed communication systems, such as the public switched telephone network (PSTN), principally in that mobile stations move between BTS (and/or different service providers) and, in doing so, encounter varying radio propagation environments.

In a wireless communication system, each BTS has associated with it a particular geographical coverage area (or cell). The coverage area is defined by a particular range where the BTS can maintain acceptable communications with MSs operating within its serving cell. Often these cells combine to produce an extensive coverage area. The preferred embodiment of the present invention is described with reference to the Third Generation Partnership Project (3GPP) defining portions of the Universal Mobile Telecommunication Standard (UMTS), including the time division duplex (TD-CDMA) mode of operation.

In UMTS parlance, a BTS is referred to as a Node B, and subscriber equipment is referred to as user equipment (UE). With the rapid development of services provided to users in the wireless communication arena, UEs encompass many forms of communication devices, from cellular phones or radios, through personal data accessories (PDAs) and MP-3 players to wireless video units and wireless internet units.

In wireless communication parlance, the communication link from the Node B to a UE is referred to as the downlink channel. Conversely, the communication link from a UE to the Node B is referred to as the uplink channel.

In such wireless communication systems, methods for simultaneously utilising the available communication resource exist where such communication resources are shared by a number of users. These methods are termed multiple access techniques. Typically, some communication resources (say communications channels, time-slots, code sequences, etc) are used for carrying traffic whilst other channels (which may be logical or dedicated channels) are used for transferring control information, such as call paging, between the Node Bs and the UEs.

It is worth noting that transport channels exist between the layer 1 and the medium access control (MAC) in the system hierarchy. Transport channels define 'how' data is transferred over the radio interface. Logical channels exist between MAC and the radio link control (RLC)/radio resource control (RRC) layers. Logical channels define 'what' is transported. Physical channels define what is actually sent over the radio interface, i.e. between layer 1 entities in a UE and a Node B.

A number of multiple access techniques exist, whereby a finite communication resource is divided into any number of physical parameters, such as:

(i) Frequency division multiple access (FDMA) whereby the total number of frequencies used in the communication system are shared, (ii) Time division multiple access (TDMA) whereby each communication resource, say a frequency used in the communication system, is shared amongst users by dividing the resource into a number of distinct time periods (time-slots, frames, etc.), and (iii) Code division multiple access (CDMA) whereby communication is performed by using all of the respective frequencies, in all of the time periods, and the resource is shared by allocating each communication a particular code, to differentiate desired signals from undesired signals.

Within such multiple access techniques, different duplex (two-way communication) paths are arranged. Such paths can be arranged in a frequency division duplex (FDD) configuration, whereby a frequency is dedicated for uplink communication and a second frequency is dedicated for downlink communication. Alternatively, the paths can be arranged in a time division duplex (TDD) configuration, whereby a first time period is dedicated for uplink communication and a second time period is dedicated for downlink communication.

Present day communication systems, both wireless and wire-line, have a requirement to transfer data between communications units. Data, in this context, includes signalling information and traffic such as video and speech communication. Such data transfer needs to be effectively and efficiently provided for, in order to optimise use of limited communication resources.

In TDMA cellular communication systems (e.g. GSM (Global System for Mobile Communications) systems) and combined TDMA/CDMA cellular communication systems (e.g. UMTS systems), time division duplex (TDD) is employed to divide the allocation of signals for uplink transmission and downlink transmission. For each consecutive TDMA frame of a given frequency channel, some timeslots are allocated to uplink communication, and some are allocated to downlink communication.

The deployment of cells conforming to the Third Generation Partnership Project (3GPP)/UMTS time division duplex (TD-CDMA) mode of operation usually assumes that large groups of cells (and in the limit the whole network) co-ordinate the split of uplink and downlink assigned slots so that the switching points in time (uplink to downlink or vice versa) are the same across this group of cells. Without this, near-located cells could severely interfere with each other because uplink and downlink data transfer would be attempted at the same time on the same frequency and timeslot.

In some cellular communication systems, a user can be assigned a given radio bearer according to his or her specific request for service. The data rate (also termed bandwidth) provided can be lower or higher depending on the service or usage being requested. Thus in UMTS, for example, higher data rate users may be assigned to a dedicated traffic channel, whereas lower data rate users may be assigned to an inferior channel alternative, for example a combination of Random Access Channel (RACH) and Forward Link Access Channel (FACH), hereinafter referred to as a RACH/FACH combination. One disadvantage associated with the RACH/FACH combination is that power control operates less efficiently than in dedicated channels.

In the 3GPP standard, dynamic re-use of the limited communication resource is a major factor in providing for efficient and effective communications. In order to dynamically re-use the resources available, the concept of shared channels has been further developed.

The current proposal in 3GPP is for an uplink resource to be requested on a random access channel (RACH). A channel (communication resource) will be granted by the system/network infrastructure on a forward access channel (FACH). A packet-data transmission would then begin using a dedicated channel (DCH). The procedure would be similar if a DCH is reactivated after a break in transmission.

It is known that shared channels can be used when the UE has been allocated a dedicated channel (DCH), i.e. in UMTS parlance it is in a cell_DCH state. Allocations of shared channels are indicated from a UMTS terrestrial radio access network (UTRAN) using the PHYSICAL SHARED CHANNEL ALLOCATION message that can be mapped to the 'logical' dedicated control channel (DCCH) or the SHCCH. Such a use of a logical DCCH or a transport-format SHCCH indication allows the UE to be allocated a communication resource by transmitting a PHYSICAL SHARED CHANNEL ALLOCATION message on the downlink of its DCH. The SHCCH is predefined as a mapped RACH or an uplink shared channel (USCH) i.e. a transport channel, in the uplink.

When uplink shared channels are employed, the UE still sends a request for a communication resource to the infrastructure. This request is termed a (physical uplink shared channel) PUSCH CAPACITY REQUEST message. The PUSCH CAPACITY REQUEST message is mapped, within the system infrastructure to a shared control channel (SHCCH), which is a 'logical' channel within the communication system.

The inventor of the present invention has recognised the inconsistencies between the methods for requesting and allocating of communication resources, particularly in relation to the TDD mode of operation in the 3GPP standard and when a UE is in a cell_DCH state. In particular, the PUSCH CAPACITY REQUEST message is undesirably limited to only using the SHCCH logical channel. This is inefficient as it means that a random access channel (RACH) must be used for PUSCH CAPACITY REQUEST messages when alternative, more efficient resources could be utilised.

A need therefore exists for an improved communication system, communication unit and method of requesting a communication resource wherein the abovementioned disadvantages associated with prior art arrangements may be alleviated.

STATEMENT OF INVENTION

In accordance with a first aspect of the present invention, there is provided a method of requesting a communication resource by a wireless communication unit operating in a wireless communication system, wherein the wireless communication system provides for uplink channels for said wireless communication unit to communicate with a wireless serving communication unit and downlink channels for said wireless serving communication unit to communicate with said wireless communication unit, the method comprising the steps of: allocating a dedicated communication channel to said wireless communication unit by said wireless serving communication unit; transmitting a communication resource request message on said dedicated uplink channel by said wireless communication unit to said wireless serving communication unit; and transmitting an access allocation message to said wireless communication unit from said wireless serving communication unit on said dedicated downlink channel.

In accordance with other aspects of the present invention, there are provided a communication system adapted to facilitate the operation of any of the above method steps, a communication unit adapted to perform any of the above method steps, and a storage medium storing processor-implementable instructions for controlling a processor to carry out the above method.

Further aspects of the invention are as claimed in the dependent claims.

In summary, the present invention provides a mechanism for communication resource requests to use previously dedicated channels, as compared to random access channels susceptible to clashes, for uplink communication resource access messages. In response to such access messages, the same dedicated resource, on the downlink channel, is used to allocate a communication resource to the requesting communication unit.

In this manner, the communication unit has utilised a previously set up dedicated channel to initiate a communication resource request. Such a solution is much more efficient and error resilient than prior art procedures.

BRIEF DESCRIPTION OF THE DRAWINGS

Embodiments of the present invention will now be described, by way of example only, with reference to the accompanying drawings, in which.

DESCRIPTION OF PREFERRED EMBODIMENTS

Figure 1:
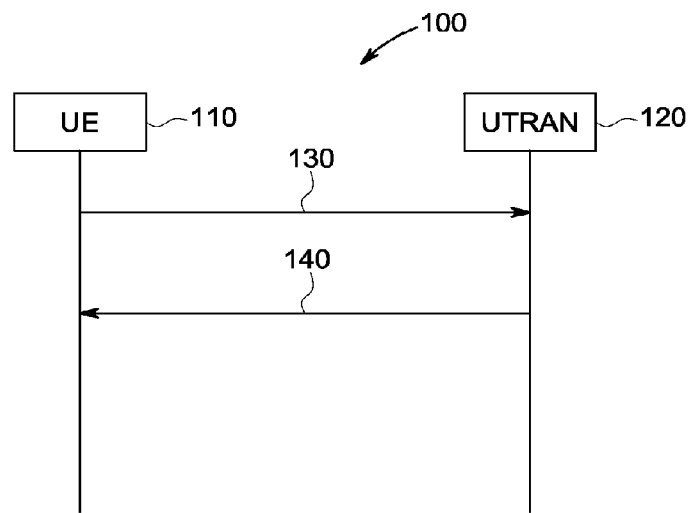
FIG. 1 shows a PUSCH capacity request procedure in accordance with the preferred embodiment of the invention.

Referring first to FIG. 1, a PUSCH capacity request procedure 100 is shown in accordance with the preferred embodiment of the invention. The PUSCH capacity request procedure 100 comprises a communication between a communication unit (UE) 110 and the UTRAN 120.

In the preferred embodiment of the present invention, the UE is in a cell_DCH state signifying that a DCH transport channel has already been set up for the UE 110. The radio link control (RLC) buffers in the UE 110, for example, indicate that the UE 110 has data to send. As a consequence, a PUSCH CAPACITY REQUEST message 130 is generated by the UE 110.

The PUSCH CAPACITY REQUEST message 130 is sent on a DCCH uplink channel using the DCH transport channel that has been previously set up. In response to the PUSCH CAPACITY REQUEST message 130, the UTRAN 120 responds with a PHYSICAL SHARED CHANNEL ALLOCATION message 140. The PHYSICAL SHARED CHANNEL ALLOCATION message 140 indicates the physical resources that the UE 110 should use to send the uplink data.

In the context of the preferred embodiment of the invention the medium access control (MAC) layer performs the mapping of the logical channels to the transport channels. Hence, when the UE is not in a cell_DCH state, the MAC layer maps the SHCCH logical channel to the RACH and USCH transport channels. The preferred embodiment of the present invention therefore provides an additional message mapping operation within the MAC layer when the UE is in a cell_DCH state, to map the DCCH logical channel to the DCH transport channel.

In this manner, the UE has utilised a previously set up DCH to initiate a PUSCH CAPACITY REQUEST message 130. Such a process utilises the DCH uplink resource in the same context as the downlink DCH downlink resource allocation message. Such a solution is much more efficient and error resilient than prior art procedures which ignore the opportunity to use the DCH uplink resource.

Furthermore, if a UE is not in a cell_DCH state, i.e. the UE is in an unacknowledged mode with respect to the radio link control layer (UM RLC), the preferred embodiment of the present invention dictates that the PUSCH CAPACITY REQUEST message 130 is sent on the uplink SHCCH. Such a process ensures consistency between the alternative transport channel mechanisms of DCCH and SHCCH access requests.

In the context of the preferred embodiment of the present invention, there are a number of advantages of using the DCCH mapped to the DCH, as compared to using the SHCCH mapped to the RACH.

A first advantage is that the preferred embodiment of the present invention enables the PUSCH CAPACITY REQUEST procedure to be operated at lower error rates, when compared to the prior art RACH process. The RACH has a predefined coding scheme, namely a half-rate convolutional coding. Therefore, in the preferred embodiment of the present invention, a much more robust coding scheme can be defined for DCH operation, for example an unpunctured ⅓-rate turbo coding scheme. As a consequence, the DCH operation is much less prone to errors.

Furthermore, a power control target for DCH can be 'individually tailored' for low error rates when sending a PUSCH capacity request. Such an individually-tailored approach to power control offers benefits over the RACH prior art method as the RACH is subject to control that will affect 'all' RACH transmissions (not only PUSCH capacity requests).

In addition, the RACH is subject to a persistence value in the MAC layer. This effectively provides a delay function, where the RACH is not transmitted unless a random number is selected, which is other than a predefined persistence value. Otherwise the operation will wait for another frame before trying again. It is noteworthy that this delay is always applied, even if it is the first attempt at sending the RACH.

Furthermore, the use of the DCH uplink resource in such a manner negates the potential problem of clashes with other UEs transmitting PUSCH CAPACITY REQUEST messages at the same time on the RACH—a well-known problem associated with RACH mechanisms.

In addition, in the context of the preferred embodiment of the present invention, there are advantages of using the DCCH mapped to the DCH, as compared to using the SHCCH mapped to the USCH. Overall throughput is maximised in CDMA systems when the target error rate is reasonably significant (target maintained due to power control) as this minimises required power. In the preferred embodiment of the present invention, it is envisaged that the USCH would be operating at a 1-10% block error rate. It would then rely on the radio link control (RLC) to clear up errors by retransmissions (using the RLC-acknowledged mode). However, PUSCH CAPACITY REQUEST messages 130 cannot be used with RLC acknowledged mode with such block error rates. Therefore, the use of a DCCH mapped on to a DCH in accordance with the present invention resolves this problem.

Figure 2:
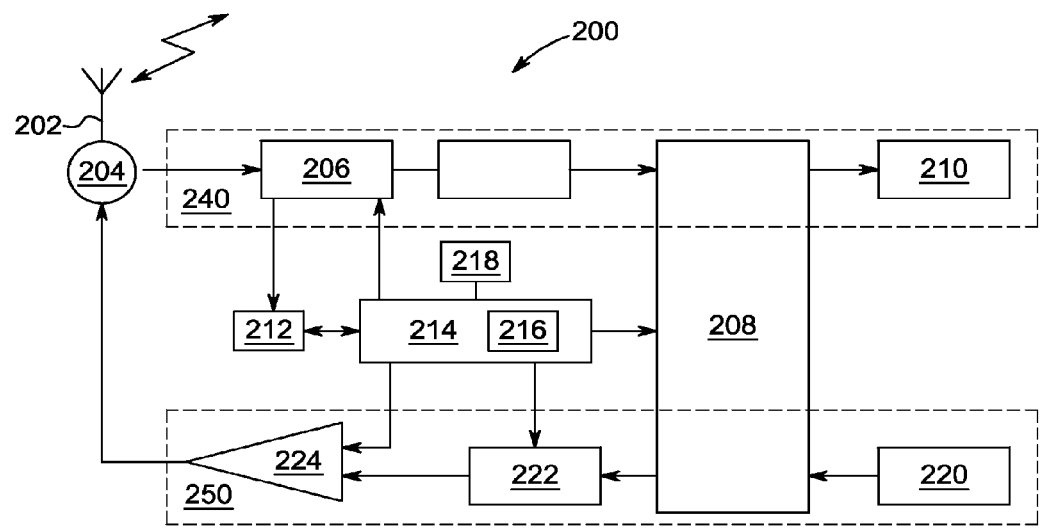
FIG. 2 shows a communication unit (UE) adapted to employ the inventive concepts of the preferred embodiment of the invention.

Referring now to FIG. 2, a block diagram of a communication unit 200, adapted in accordance with the inventive concepts of the present invention, is shown. The communication unit will be described as a UE, although similar circuitry and operation will be utilised in a Node B, as known to those skilled in the art.

The UE 200 contains an antenna 202 coupled to a duplex filter or circulator 204 that provides isolation between the receiver chain 240 and transmit chain 250 within the UE 200.

The receiver chain 240, as known in the art, may include scanning and/or switchable receiver front-end circuitry 206 (effectively providing reception, filtering and intermediate or base-band frequency conversion). The scanning front-end circuit is serially coupled to a signal processing function 208.

An output from the signal processing function 208 may be provided to suitable output devices such as a display screen 210.

The receiver chain 240 also includes received signal strength indicator (RSSI) circuitry 212, which in turn is coupled to a controller 214 that operates to maintain overall control of the different functions and modules of the UE 200. The controller 214 is also coupled to the scanning receiver front-end circuitry 206 and the signal processing function 208 (generally realised by at least one digital signal processor (DSP)).

The controller 214 includes a memory 216 that stores operating regimes, such as decoding/encoding functions and the like. The controller also contains error detection function, for detecting errors in the received data stream. A timer 218 is typically coupled to the controller 214 to control the timing of operations (transmission or reception of time-dependent signals) within the UE 200.

As regards the transmit chain 250, this essentially includes an input device 220 such as a keyboard, keypad, microphone or the like. The input devices are each coupled in series through transmitter/modulation circuitry 222 and a power amplifier 224 to the antenna 202. The transmitter/modulation circuitry 222 and the power amplifier 224 are operationally responsive to the controller.

In accordance with a preferred embodiment of the invention, the UE 200, and in particular the signal processor 208 preferably in conjunction with the controller 214, timer 218 and transmit chain 250 has been adapted to transmit a new PUSCH CAPACITY REQUEST message in order to obtain access to the respective communication system. Instead of transmitting the PUSCH CAPACITY REQUEST message on a RACH or USCH (SHCCH mapped to RACH or USCH), as proposed in the 3GPP standard, the UE transmits a PUSCH CAPACITY REQUEST message on its DCH, when in the cell_DCH state.

As is known in the art, substantially the same elements and functionality in the UE can be found in the Node B, albeit with the Node B having slightly more functional capabilities in order to cope, for example, with transmissions from, and to, a large number of UEs. Hence, the receiver chain 240, processor 208 and controller 214 in a Node B arrangement have also been adapted to receive and process the new PUSCH CAPACITY REQUEST message, and forward the message to the RNC as the respective UTRAN element that allocates the shared communication resource.

The various components within the UE 200 are realised in this embodiment in integrated component form. Of course, in other embodiments, they may be realized in discrete form, or a mixture of integrated components and discrete components, or indeed any other suitable form. Further, in this embodiment the controller 214 including memory 216 is implemented as a programmable processor, but in other embodiments can comprise dedicated circuitry or any other suitable form.

It is within the contemplation of the invention that such request procedures may be introduced to the UE 200, Node B (or any other appropriate apparatus) in the form of processor-implementable instructions and/or data.

It is within the contemplation of the invention that the processor 208 and/or controller 214 described in the above embodiments can be embodied in any suitable form of software, firmware or hardware. The processor 208 and/or controller 214 may be controlled by processor-implementable instructions and/or data, for carrying out the methods and processes described, which are stored in a storage medium or memory, for example the memory 216. The memory can be a circuit component or module, e.g. a RAM or PROM, or a removable storage medium such as a disk, or other suitable medium.

Figure 3:
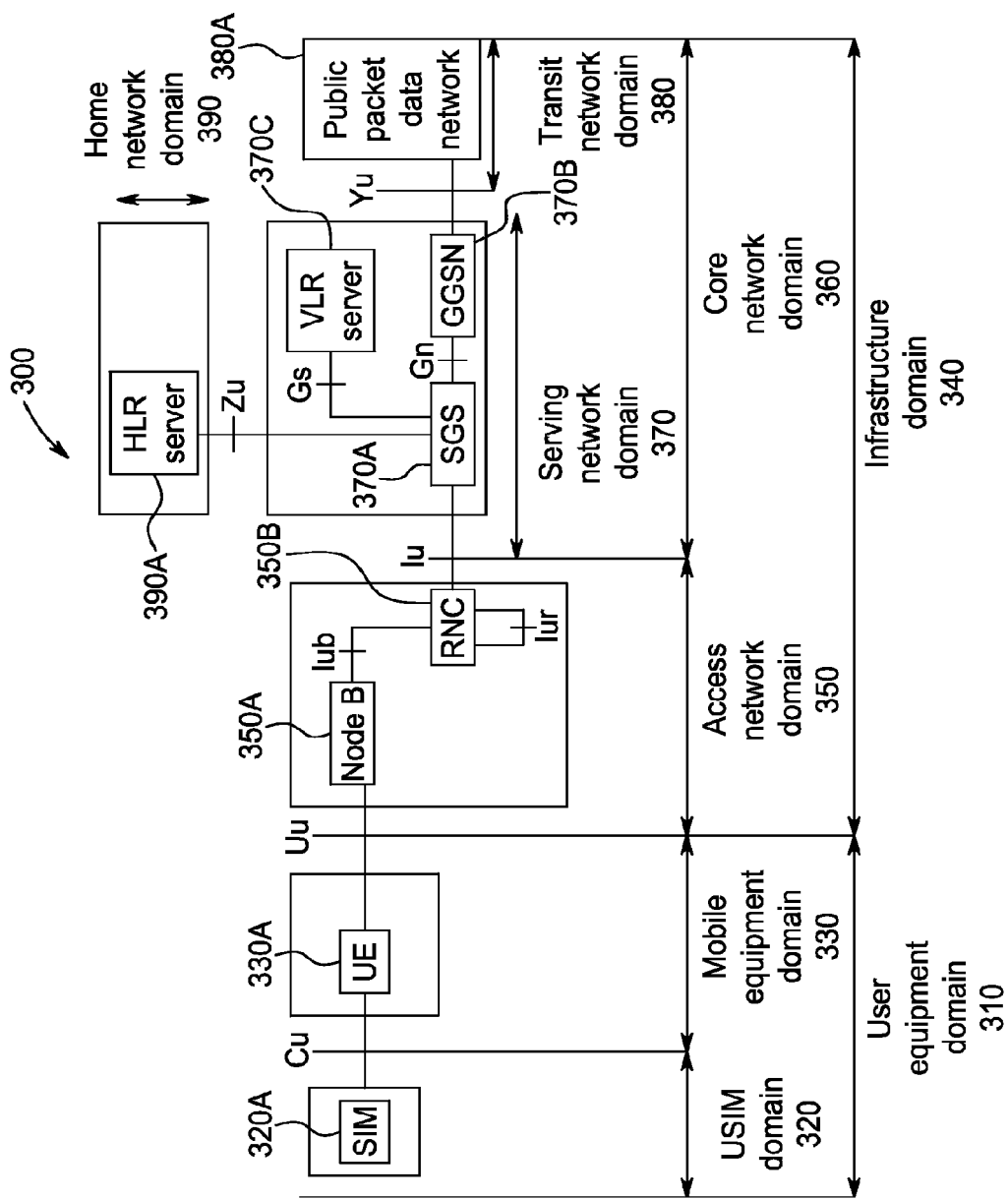
FIG. 3 shows a communication system adapted to employ the inventive concepts of the preferred embodiment of the invention.

Referring next to FIG. 3, a standard UMTS communication system/network 300, in a hierarchical form, is shown. The communication system 300 is compliant with, and contains network elements capable of operating over, a UMTS and/or a GPRS air-interface. In particular, the invention relates to the Third Generation Partnership Project (3GPP) specification for wide-band code-division multiple access (WCDMA) standard relating to the UTRAN radio Interface (described in the 3G TS 25.xxx series of specifications).

The network is conveniently considered as comprising: user equipment domain 310, made up of a user SIM (USIM) domain 320 and a mobile equipment domain 330; and an infrastructure domain 340, made up of an access network domain 350, and a core network domain 360, which is in turn made up of a serving network domain 370 and a transit network domain 380 and a home network domain 390.

In the mobile equipment domain 330, UE 330A receive data from a user SIM 320A in the USIM domain 320 via the wired Cu interface. The UE 330A communicates data with a Node B 350A in the network access domain 350 via the wireless Uu interface. Within the network access domain 350, the Node Bs 350A contain one or more transceiver units and communicate with the rest of the cell-based system infrastructure, for example RNC 350B, via an I.sub.ub interface, as defined in the UMTS specification.

The RNC 350B communicates with other RNC's (not shown) via the Iur interface. The RNC 350B communicates with a SGSN 370A in the serving network domain 370 via the Iu interface. Within the serving network domain 370, the SGSN 370A communicates with a GGSN 370B via the Gn interface, and the SGSN 370A communicates with a VLR server 370C via the Gs interface. The SGSN 370A communicates with an HLR server (390A) in the home network domain 390 via the Zu interface. The GGSN 370B communicates with public data network in the transit network domain 380 via the Yu interface.

The GGSN 370B (and/or SSGN) is responsible for UMTS (or GPRS) interfacing with a Public Switched Data Network (PSDN) 380A such as the Internet or a Public Switched Telephone Network (PSTN). The SGSN 370A performs a routing and tunnelling function for traffic within say, a UMTS core network, whilst a GGSN 370B links to external packet networks, in this case ones accessing the UMTS mode of the system Thus, the elements RNC 350B, SGSN 370A and GGSN 370B are conventionally provided as discrete and separate units (on their own respective software/hardware platforms) divided across the access network domain 350 and the serving network domain 370.

The RNC 350B is the UTRAN element responsible for the control and allocation of resources for numerous Node Bs 350A; typically 50 to 100 Node B's may be controlled by one RNC 350B. The RNC 350B also provides reliable delivery of user traffic over the air interfaces. RNCs communicate with each other (via the interface Iur) to support handover and macro diversity.

The SGSN 370A is the UMTS Core Network element responsible for Session Control and interface to the Location Registers (HLR and VLR). The SGSN is a large centralised controller for many RNCs.

The GGSN 370B is the UMTS Core Network element responsible for concentrating and tunnelling user data within the core packet network to the ultimate destination (e.g., an internet service provider (ISP)).

In the preferred embodiment of the invention, at least one UE 330A and at least one Node B 350A and RNC 350B have been adapted, to offer, and provide for, transmission, reception, processing and responding to such processing of PUSCH CAPACITY REQUEST messages generated in accordance with the approach detailed above.

More generally, the adaptation may be implemented in the respective communication units in any suitable manner. For example, new apparatus may be added to a conventional communication unit, or alternatively existing parts of a conventional communication unit may be adapted, for example by reprogramming one or more processors therein. As such the required adaptation may be implemented in the form of processor-implementable instructions stored on a storage medium, such as a floppy disk, hard disk, PROM, RAM or any combination of these or other storage multimedia.

It is also within the contemplation of the invention that such adaptation of transmission characteristics may alternatively be controlled, implemented in full or implemented in part by adapting any other suitable part of the communication system 300.

Further, in the case of other network infrastructures, implementation of the processing operations may be performed at any appropriate node such as any other appropriate type of base station, base station controller, etc. Alternatively the aforementioned steps may be carried out by various components distributed at different locations or entities within any suitable network or system.

It will be understood that the mechanism for transmitting a PUSCH capacity request message on a dedicated control channel, as described above, provides the following advantages:

(i) It enables the uplink DCH to be used, instead of the RACH, to request a shared communication resource when uplink shared channels are used and the UE is in cell_DCH state;

(ii) The provision of a DCH for such a communication resource request benefits, by applying a much more robust coding scheme for DCH so that it is less prone to errors or collisions when compared to RACH;

(iii) A Power control target for DCH operation can be individually tailored for low error rates when sending a PUSCH capacity request;

(iv) The use of a DCCH to DCH mapping operation avoids inherent delays associated with using a RACH mechanism;

(v) The use of a DCCH to DCH mapping operation avoids the inherent access-clashes associated with using a RACH mechanism; and (vi) Overall throughput is maximized, in the context of a CDMA system when the target error rate is reasonably significant and maintained due to power control.

It will be appreciated that the method described above will typically be performed by computer software program(s), in the user equipment and/or else where in the system, which may be transferred on computer readable data carriers such as magnetic or optical disks (not shown).

Thus, an improved communication system, communication unit and method of requesting a communication resource have been described wherein the abovementioned disadvantages associated with prior art arrangements have been substantially alleviated.

What is claimed is:

1. A network device comprising:
   circuitry configured to send, to a user equipment (UE), configuration information to configure a power controlled uplink channel, wherein the power controlled uplink channel is particular to the UE and used to receive control information;
   circuitry configured to receive, from the UE via the power controlled uplink channel, a request to utilize a physical uplink shared channel, the physical uplink shared channel capable of being shared by a plurality of UEs;
   wherein the request is received at a first power and other information is received at a second power; and
   the circuitry further configured to send, to the UE, physical uplink shared channel resource allocation in association with the request.

2. The network device of claim 1, wherein the request is a physical uplink shared channel (PUSCH) capacity request.

3. The network device of claim 1, wherein the network device or UE is configured for code division multiple access (CDMA).

4. The network device of claim 1, wherein the network device or UE is configured for Universal Mobile Telecommunication Standard (UMTS) or wide-band code division multiple access (W-CDMA).

5. The network device of claim 1, wherein the power controlled uplink channel is a control channel.

6. A method performed by a network device, the method comprising:
   sending, by the network device to a user equipment (UE), configuration information to configure a power controlled uplink channel, wherein the power controlled uplink channel is particular to the UE and used to receive control information;
   receiving, by the network device from the UE via the power controlled uplink channel, a request to utilize a physical uplink shared channel, the physical uplink shared channel capable of being shared by a plurality of UEs;
   wherein the request is received at a first power and other information is received at a second power; and
   sending, to the UE, physical uplink shared channel resource allocation in association with the request.

7. The method of claim 6, wherein the request is a physical uplink shared channel (PUSCH) capacity request.

8. The method of claim 6, wherein the network device or UE is configured for code division multiple access (CDMA).

9. The method of claim 6, wherein the network device or UE is configured for Universal Mobile Telecommunication Standard (UMTS) or wide-band code division multiple access (W-CDMA).

10. The method of claim 6, wherein the power controlled uplink channel is a control channel.

11. A wireless network comprising:
    a user equipment (UE) comprising:
    circuitry configured to receive, by the UE from a network device, configuration information to configure a power controlled uplink channel, wherein the power controlled uplink channel is particular to the UE and used to send control information;
    circuitry configured to send, by the UE via the power controlled uplink channel, a request to utilize a physical uplink shared channel, the physical uplink shared channel capable of being shared by a plurality of UEs;
    wherein the request is sent at a first power and other information is sent at a second power; and
    wherein physical uplink shared channel resources are received by the UE in association with the request.

12. The wireless network of claim 11, wherein the request is a physical uplink shared channel (PUSCH) capacity request.

13. The wireless network of claim 11, wherein the wireless network or UE is configured for code division multiple access (CDMA).

14. The wireless network of claim 11, wherein the wireless network or UE is configured for Universal Mobile Telecommunication Standard (UMTS) or wide-band code division multiple access (W-CDMA).

15. The wireless network of claim 11, wherein the power controlled uplink channel is a control channel.

16. A method performed by a wireless network, the method comprising:
    receiving, by a user equipment (UE) from a network device, configuration information to configure a power controlled uplink channel, wherein the power controlled uplink channel is particular to the UE and used to send control information;
    sending, by the UE via the power controlled uplink channel, a request to utilize a physical uplink shared channel, the physical uplink shared channel capable of being shared by a plurality of UEs;
    wherein the request is sent at a first power and other information is sent at a second power; and
    wherein physical uplink shared channel resources are received by the UE in association with the request.

17. The method of claim 16, wherein the request is a physical uplink shared channel (PUSCH) capacity request.

18. The method of claim 16, wherein the wireless network or UE is configured for code division multiple access (CDMA).

19. The method of claim 16, wherein the wireless network or UE is configured for Universal Mobile Telecommunication Standard (UMTS) or wide-band code division multiple access (W-CDMA).

20. The method of claim 16, wherein the power controlled uplink channel is a control channel.

21. A user equipment (UE) comprising:
circuitry configured to receive, from a network device, configuration information to configure a power controlled uplink channel, wherein the power controlled uplink channel is particular to the UE and used to send control information;
circuitry configured to send, by the UE via the power controlled uplink channel, a request to utilize a physical uplink shared channel, the physical uplink shared channel capable of being shared by a plurality of UEs;
wherein the request is sent at a first power and other information is sent at a second power; and
the circuitry further configured to receive physical uplink shared channel resource allocation in association with the request.

22. The UE of claim 21, wherein the request is a physical uplink shared channel (PUSCH) capacity request.

23. The UE of claim 21, wherein the network device or UE is configured for code division multiple access (CDMA).

24. The UE of claim 21, wherein the network device or UE is configured for Universal Mobile Telecommunication Standard (UMTS) or wide-band code division multiple access (W-CDMA).

25. The UE of claim 21, wherein the power controlled uplink channel is a control channel.

26. A method performed by a user equipment (UE), the method comprising:
receiving, by the UE from a network device, configuration information to configure a power controlled uplink channel, wherein the power controlled uplink channel is particular to the UE and used to send control information;
sending, by the UE via the power controlled uplink channel, a request to utilize a physical uplink shared channel, the physical uplink shared channel capable of being shared by a plurality of UEs;
wherein the request is sent at a first power and other information is sent at a second power; and
receiving, by the UE, physical uplink shared channel resources in association with the request.

27. The method of claim 26, wherein the request 1s a physical uplink shared channel (PUSCH) capacity request.

28. The method of claim 26, wherein the network device or UE is configured for code division multiple access (CDMA).

29. The method of claim 26, wherein the network device or UE is configured for Universal Mobile Telecommunication Standard (UMTS) or wide-band code division multiple access (W-CDMA).

30. The method of claim 26, wherein the power controlled uplink channel is a control channel.

* * * * *